United States Patent [19]
Wagaman

[11] Patent Number: 4,954,328
[45] Date of Patent: Sep. 4, 1990

[54] SYNTHESIS OF HYDROXYLAMINE SALTS

[75] Inventor: Kerry L. Wagaman, Clinton, Md.

[73] Assignee: The United States of America as represented by the Secretary of the Navy, Washington, D.C.

[21] Appl. No.: 470,812

[22] Filed: Jan. 28, 1983

[51] Int. Cl.$^5$ ............................................. C01B 21/14
[52] U.S. Cl. ...................................... 423/386; 423/387
[58] Field of Search ................ 423/386, 387, 545, 551

[56] References Cited

U.S. PATENT DOCUMENTS

| | | | |
|---|---|---|---|
| 3,145,082 | 8/1964 | Rausch et al. | 423/387 |
| 3,147,070 | 9/1964 | Rausch | 23/14 |
| 3,148,940 | 9/1964 | Groves | 23/14 |
| 3,313,595 | 4/1967 | Jockers et al. | 23/117 |
| 3,420,621 | 1/1969 | Watters et al. | 23/85 |
| 3,508,864 | 4/1970 | Thompson et al. | 23/85 |
| 3,695,834 | 10/1972 | Wheelwright | 423/395 |
| 4,147,623 | 4/1979 | Koff et al. | 423/387 |
| 4,166,842 | 9/1979 | Tunick et al. | 423/387 |
| 4,202,765 | 5/1980 | Koff et al. | 423/387 |
| 4,335,091 | 6/1982 | Scholz et al. | 423/387 |
| 4,507,248 | 3/1985 | Mathew et al. | 423/387 |
| 4,551,323 | 11/1985 | Mathew et al. | 423/387 |
| 4,551,324 | 11/1985 | Mathew et al. | 423/387 |
| 4,707,294 | 11/1987 | Mathew et al. | 423/387 |

OTHER PUBLICATIONS

Agladze et al., *Chem. Abs.*, 67, Abs. #17396q (1967).

*Primary Examiner*—Edward A. Miller
*Attorney, Agent, or Firm*—John D. Lewis; Kenneth E. Walden

[57] ABSTRACT

Hydroxylamine perchlorate or nitrate is prepared by forming an alcohol-hydroxylamine solution from reacting a slurry of hydroxylamine sulfate in alcohol with sodium alkoxide, reacting perchloric acid or nitric and therewith to form the desired salt, and separating the salt.

14 Claims, No Drawings

SYNTHESIS OF HYDROXYLAMINE SALTS

BACKGROUND OF THE INVENTION

The invention pertains generally to inorganic synthesis and in particular to synthesis of energetic oxidizer salts.

A liquid propellant is referred to as a monopropellant, if the oxidizer is kept with the fuel, or as a bipropellant, if the oxidizer is kept separate until the two are reacted. Presently three liquid oxidizers are used except for special applications such as in propellants for outerspace travel. The first oxidizer, a 90 percent aqueous solution of hydrogen peroxide, has serious stability problems and is therefore difficult to store. Inhibited red fuming nitric acid (IRFNA) is extremely toxic and corrosive. The third oxidizer is 70 percent perchloric acid which has extremely corrosive reaction products and is toxic. These disadvantages of the oxidizers have restricted the use of liquid propellants for rockets, gun systems, and torpedoes.

Aqueous solutions of hydroxylamine salts of perchloric or nitric acid have been shown to be excellent energetic oxidizers for general purpose rockets, gun systems, and torpedoes. The solutions are very energetic, stable, insensitive, and have low freezing points. Many liquid propellant formulations with one of these oxidizers have freezing points below $-25°$ C. The oxidizer solutions themselves have freezing points around $-18°$ C. Hydroxylamine nitrate (HAN) has an additional advantage of producing no corrosive products of combustion; however, this oxidizer is less energetic and stable than hydroxylamine perchlorate (HAP). The major disadvantage and the main reason for the virtual nonuse of these oxidizers, in the past, is their cost.

Recently HAN has been commercially prepared by a batch electrolytic method on a small scale at a reasonable cost. The disadvantages of the method are the large requirements for electricity, batch operation, equipment costs, and scale of operation. This method would be inappropriate for a large production, and it can not produce the more important oxidizer, HAP. Hydroxylamine salts have been prepared, in the laboratory, by an electrolytic method described in CA 17396q 67 (1967). This method would produce a product extremely high in metallic contaminents and is not suitale for large scale production. Also HAP cannot be prepared by this method.

Presently no method exists which can produce HAP at a cost low enough for this oxidizer to be utilized in propellants other than small specialty propellants and no method exists which can produce HAN continuously on a large scale at a low cost. The existing methods have one or more disadvantages, causing the cost of the oxidizers to be too high. Often water is utilized as a solvent, causing serious problems with metallic and other ionic contaminations in the product even after extensive purification. These contaminants can interfere with the performance and stability of the oxidizer. Another common problem is that the product stream is too dilute, therefore requiring expensive distillation or other concentration techniques. On account of the corrosiveness of the reactants, the process equipment for some methods must have glass and glass-lined equipment. Other methods require toxic and/or flammable organic reactants. Often the methods involve many processing steps or long processing times, again increasing the overall cost of the product.

The oxidizers are presently prepared by three general methods: aqueous sulfate precipitation, anhydrous precipitation and ion exchange. Each process has one or more features that greatly increase costs.

In the aqueous precipitation process, a saturated aqueous solution of hydroxylamine sulfate is combined with a saturated aqueous solution of sodium, calcium or barium nitrate or perchlorate. These reactions result in the formation of a very difficult-to-filter sulfate precipitate and of an aqueous solution of either hydroxylamine nitrate (HAN) or hydroxylamine perchlorate (HAP). In the case of HAN, the concentration is about 15%. Since most of the useful concentrations of these oxidizers are in the 50 to 85% range water has to be removed by the costly process of distillation. Because the sulfate is difficult to precipitate, residual metal contaminants are present in high concentrations in the final product.

Two methods are disclosed in U.S. Pat. No. 3,420,621 by Watters et al which employ the anhydrous precipitation technique. By this first method, an alcoholic slurry of hydroxylamine sulfate (HAS) is neutralized with alcoholic caustic, resulting in the formation of water as a reaction product. After filtering, the resulting free amine solution is then neutralized with an acid-water mixture. If an aqueous solution of the resulting hydroxylamine salt is desired, the alcohol can be removed by evaporation. In the second method, an alcoholic solution of sodium perchlorate is reacted with an alcoholic solution of hydroxylamine hydrochloride at 50° C. with agitation. After cooling, the sodium chloride precipitate is removed by filtration, leaving a 21% solution of HAP in alcohol. If an aqueous solution of the hydroxylamine salt is desired, water is added and the alcohol is removed by distillation. Hydroxylamine hydrochloride is relatively soluble in methanol but is not available commercially. Hydroxylamine sulfate (HAS) is commercially available but cannot be substituted in this reaction because it is insoluble in alcohols. Both of these syntheses use a flammable and toxic solvent (methanol). Also, a very flammable ether must be added to the alcohol-HAP mixture to precipitate the inorganic impurities.

Two examples of the ion-exchange technique which have been used are disclosed in U.S. Pat. No. 3,508,864 by Thompson et al and in U.S. Pat. No. 3,695,834 by Earl J. Wheelwright. In Thompson et al HAP is prepared by using ion exchange resins to separate interfering ions from the starting hydroxylammonium and perchlorate reactants. In both processes, an excess of acid is used, causing problems of stability and corrosion. Also free perchloric acid can cause a secondary combustion after a torpedo has been fixed. This event presents a serious hazard to personnel in collecting and recharging fired torpedoes. In addition to those problems, organic contaminants from resin degradation are often present in the final product.

Another salt, i.e. sulfate, of hydroxylamine has been prepared by a catalytic reduction of nitric oxide with hydrogen in contact with a platinum catalyst and dilute sulfuric acid. The method is taught in U.S. Pat. No. 3,313,595 by Jockers et al. This synthesis technique has not been successful with the nitrate and perchlorate salts.

Hydroxylamne coordination compounds have been prepared by a homogenuous solution method comprising reacting sodium ethoxide with hydroxylamine hydrochloride in ethyl alcohol. The methods are disclosed in U.S. Pat. No. 3,147,070 by Douglas A. Ranch and in U.S. Pat. No. 3,148,940 by Kenneth O. Groves.

In Applicant's co-pending application for the Synthesis of Hydroxylamine Salts, filed on Jan. 28, 1983, ammonia reacts with hydroxylamine sulfate. The advantage of the synthesis utilizing ammonia is the extremely low cost of the chemical. However, the synthesis has a problem with the by-product, ammonium sulfate, which coats hydroxylamine sulfate and the reaction is just moderately fast.

SUMMARY OF THE INVENTION

It is, therefore, an object of the present invention to prepare hydroxylamine perchlorate (HAP) or nitrate (HAN) at a low cost in high yield and purity.

A further object is to prepare HAP or HAN using nonaqueous solvents and with relatively nontoxic and non-flammable chemicals.

A still further object is to prepare HAP or HAN with stainless steel equipment.

Another object is to prepare HAP or HAN very quickly with few processing steps.

Yet another object is to prepare HAP or HAN without also preparing ammonium sulfate.

These and other objects are achieved by preparing a hydroxylamine alcohol solution from a reaction between sodium alkoxide and hydroxylamine sulfate an alcohol-hydroxylamine sulfate slurry, reacting the hydroxylamine alcohol solution with nitric or perchloric acid to produce a hydroxylamine salt, and separating the salt.

DETAILED DESCRIPTION OF THE INVENTION

The fullest benefit of the present invention is obtained by reacting relatively inexpensive and available materials to synthesize a hydroxylamine acid salt rather than reacting the intermediate, hydroxylamine, with an acid to obtain the salt. It has been determined that it is possible to achieve the required high-degree purity with the method of the present invention although several reactions are involved, hydroxylamine sulfute is virtually insoluble in alcohol, hydroxylamine has a low solubility in alcohol, and a reaction with a strong acid occurs in an alcohol solution.

A slurry is prepared by mixing powdered hydroxylamine sulfate with methanol, ethanol or a mixture. The alcohol is at least 88 percent concentrated and preferably is 95 percent. Methanol or ethanol is relatively nontoxic and nonflammable and has a boiling point lower than that of water but is not too low. The preferred loading of hydroxylamine sulfate is from 10 to 14 weight percent and most preferably from 11 to 13 percent of the total slurry weight. Although any loading can be used, the preferred loadings produce an 11 to 12 percent hydroxylamine solution. This concentration has been found to avoid contamination and separation problems. The above concentrations are preferred for both methanol and ethanol solutions, even though hydroxylamine solubility in methanol is about 35 percent as opposed to about 15 percent for ethanol.

The average particle size of the sulfate is less than about 200 micrometers and preferably less than about 75 micrometers. If the average particle size is greater than 200 micrometers, than the alcohol slurry would have to be mixed by a high-shear mixer in order to reduce the particle size to the above range. The slurry is agitated, but high-shear mixing is not necessary. However better mixing and smaller particle size improve yield and reaction time. The slurry is agitated during and after the addition of sodium alkoxide to the slurry. The temperature of the slurry before and during the addition of the alkoxide is not in excess of about 60° C., preferably from 20 to 45° C., and most preferably from 25 to 35° C. If the temperature is too high, sodium alkoxide, being a strong base, would decompose hydroxylamine and the alcohol solvent would evaporate. If the temperature is too low, the reaction proceeds too slowly. With the temperature range from 25 to 35° C., the reaction proceeds quickly and no decomposition of hydroxylamine occurs. The heat of reaction might necessitate cooling means being added in order to maintain the desired temperature.

The sodium alkoxide is either the methoxide or ethoxide. It is also possible to use a mixture of sodium alkoxides. Alkoxide can be added as a powder, but processing is simpler if it is added as a solution. Both are commercially available as alcohol solutions. Preferably a 25 to 35 percent methanol or ethanol solution is used.

Since sodium methoxide or ethoxide is a strong base, this reactant can decompose hydroxylamine and would also react with the acid reactant. For these reasons, sodium alkoxide is added in an amount not in excess of one weight percent over stoichiometry, preferably less than 0.3 weight percent over stoichiometry, and most preferably of stoichiometry. An excess of sodium alkoxide can be removed by the addition of an acid, e.g. sulfuric acid or perchloric acid.

The hydroxylamine-solution stage of the subject process can be easily made continuous in the following manner. The hydroxylamine sulfate solids would be slurried in an alcohol by use of an agitated holding tank or a screw feeder. This slurry would then be pumped through a pipe to a mixing tee where the sodium alkoxide would be introduced. The reaction mixture would then be fed into an agitated reactor. The resulting reaction solution could then be cooled in a heat exchanger or in a a cooled, agitated holding tank. The solution temperature should be maintained from 35 to 55° C. The by-product sodium sulfate would be slurried in the alcohol-hydroxylamine solution and would then be passed to a centrifuge or a scraped-wall filter where these solids would be separated and removed continuously, producing a solution of hydroxylamine in alcohol. Obviously numerous other methods exist for making this stage continuous.

Preferably sodium sulfate is removed from the reaction mix before the acid reactant is added. Removal can be effected by a simple filtration. The insolubility of the salt allows removal by many other techniques. If an acid other than sulfuric acid, such as perchloric acid, is used to neutralize an excess of sodium alkoxide, the resulting salt would also be filtered out.

The exothermic reaction of hydroxylamine with perchloric or nitric acid proceeds very rapidly even at low temperatures. In order to minimize the possible side reaction of the acid with the alcohol and also the decomposition of hydroxylamine, the acid is added under vigorous agitation at a temperature of less than about 55° C. and preferably less than 40° C. It is preferred that the temperature is not kept below 25° C. because of the increased cooling costs. The acid is preferably added in a stoichiometric amount. If less than a stoichiometric amount is added, unstable free hydroxylamine is present. An excess of the acid would be wasteful and could present corrosion problems The acid is preferably an aqueous solution with a concentration from about 60 to about 75 percent and preferably from 60 to 72 percent. The preferred concentrations are commercially the most available and ones which have fewer side reactions and contamination problems. To prevent a side reaction between the alcohol and the acid, an amount of water at least equal to about 33 weight percent of the acid should be initially present or be added with the acid. For this reason, acid concentrations in excess of 75 percent and nonaqeous acid solutions give no benefit and can cause problems.

After the reaction is complete, a mixture of alcohol, water (a neutralization by-product) and a hydroxylamine salt is present. Alcohol is removed by, e.g. vacuum distillation. Another alcohol, such as propanol or butanol, can be added to the mixture to remove water as an azeotropic mixture. Since most uses of HAP and HAN are as aqueous solutions, water would not have to be removed, just the alcohol.

In order to make this stage of the synthesis continuous, the hydroxylamine-alcohol mixture could be passed through a cooled heat exchanger to lower the temperature of the solution to about 0° C. The hydroxylamine could then be passed through a mixing tee where an equimolar amount of acid is introduced. This mixture could then be agitated by passing it through an in-line agitator or through a packed column. The resulting salt-alcohol-$H_2O$ mixture could then be passed into a vacuum distillation column where the alcohol is removed and the still pot bottoms would consist of the desired salt-$H_2O$ solution. If a higher concentration of salt would be desired, more water could be removed by further distillation. The resulting salt-$H_2O$ mixture may contain some residual ammonium perchlorate (AP) solids and would have to be cooled in another heat exchanger to $-15°$ C., to precipitate the AP. The final solution would again be passed through a continuous centrifuge or filter and then be sent for packaging and analysis.

Having described the invention in general the following examples are given by way of illustration. It is understood that the examples do not limit the description of the invention or the claims to follow.

EXAMPLE I

Synthesis of Hydroxylamine Perchlorate

A slurry of 3.3 kg of hydroxylamine sulfate (HAS) with an average particle size of 100 micrometers in 13 liters of 95 percent ethanol (5% water) was mixed by a paddle mixer in a 19-liter stainless steel bath reactor. A stoichiometric amount of an ethanol solution of sodium ethoxide (25%) was added. The temperature was kept at 28° C. The reaction was complete after five minutes. Some coating of HAS was evident. Approximately 9.3 liters of 11 percent hydroxylamine (HA) in ethanol solution were recovered by vacuum filtration with an immersion filter. Approximately 3.1 of the 13 liters of solvent were retained on the filter cake which typically consists of 3 liters of of ethanol, 0.3 kg HA, 0.3 kg unreacted HAS and 2.5 kg sodium sulfate. This 26 percent loss of HA solution, coupled with a eleven percent loss of product because of unreacted HAS, lowered the overall yield for this synthesis to about 66 percent.

Three liters of ethanol were then added to the filter cake. The slurry was agitated for about five minutes and then filtered under vacuum using an immersion filter. Three liters of solvent were retained on the filter cake and 31 liters of filtrate were recovered. Half of the previously retained HA was recovered in the filtrate which raised the overall reaction yield from 66 to 79 percent. An additional wash with 13 liters of ethanol raised the overall HA yield to about 84 percent, based on reacted HAS. It was concluded that HA was retained because of the presence of the solvent and not because of chemical attraction to the solids in the filter cake. If a centrifuge had been used, the recovery is estimated to be from 90 to 95 percent of the initially available filtrate.

The reactor was charged with the above HA-alcohol solution at a temperature of about 30° C. The air operated paddle stirrer was again used to vigorously agitate the solution. A stoichiometric amount of aqueous perchloric acid (65%) was added and the temperature was allowed to rise to 45° C. The reaction was complete after about ten minutes, giving an almost 100 percent yield.

The mixture of alcohol-water-HAP from the neutralization was distilled under vacuum to remove the alcohol and some of the water. The condensate of the distillation consisted of 83 percent ethanol and 17 percent water. The reasons for the relatively low alcohol concentration were the lack of reflux or distillation column and changes of the activity coefficients due to differences in the solubility of the HAP in the water and the alcohol.

The quality of HAP produced in the above method is shown by a comparison in Table I of this HAP with a commercially available HAP produced by an aqueous precipitate method. This HAP is thermally stable up to 200° C., but the commercially available HAP is stable only up to 180° C.

TABLE 1

| Chemical | Aqueous Precipitation | | |
|---|---|---|---|
| | Lot 8012 | Lot 8048 | Example 1 |
| HAP | 56.7% | 57.3% | 82.0% |
| Water | 42.4% | 38.0% | 17.5% |
| Excess Perchloric Acid | 0.2% | 0.1% | — |
| Impurities | | | |
| Na | 0.2% | 1.4% | — |
| Fe | 0.0011% | 0.0026% | 0.0001% |
| Ca | 0.0013% | — | — |
| Mg | 0.0013% | — | — |
| Ni | 0.00008% | 0.00002% | 0.00001% |
| Cr | — | — | 0.000015% |
| Miscellaneous | 0.5% | 3.2% | 0.5% |

EXAMPLE II

Synthesis of Hydroxylamine Perchlorate

Example I was repeated for sodium methoxide with methanol as the solvent. Sodium sulfate was removed by centrifuging. After washing the centrifuge cake with methanol, the yield at this stage was approximately 95 percent. Perchloric acid was reacted as before and the HAP had the same analysis as Example I.

EXAMPLE III

Synthesis of Hydroxylamine Nitrate

Example I was repeated except that sixty percent nitric acid was used as the acid reactant. The results were comparable with the HAP synthesis.

The subject synthesis can produce HAP or HAN in yields in excess of 90 percent with a purity in excess of that found in the commercially available salts. The increased thermal stability is probably due to the higher purity. Most importantly, this synthesis produces HAP at a cost of about one half of the lowest-cost method currently being used, thereby making HAP practical for many new applications. By this method, HAN is prepared at a cost comparable to the presently available lowest cost without the need of much energy. Further the present method is suitable for high-volume production. Although material costs are slightly higher than the synthesis in Applicant's co-pending application, the processing is simpler which for large-scale production could be the the controlling factor.

Obviously, many modifications and variations of the present invention are possible in light of the above teachings. It is therefore to be understood that, within the scope of the appended claims, the invention may be practiced otherwise than as specifically described.

What is claimed is:

1. A method for preparing a hydroxylamine acid salt which comprises:
   preparing a slurry of hydroxylamine sulfate in an alcohol at a temperature not in excess of about 60° C.;
   high-shear mixing sodium alkoxide with said slurry to form a hydroxylamine-alcohol solution and sodium sulfate while maintaining the temperature of said slurry at or below 60° C.;
   removing sodium sulfate;
   agitating said solution;
   admixing an acid selected from the group consisting of perchloric acid and nitric acid with said solution at a temperature not in excess of about 55° C. to form said hydroxylamine acid salt; and
   recovering said hydroxylamine acid salt.

2. The method of claim 1 wherein said slurry is prepared and maintained at a temperature from about 20 to about 45° C.

3. The method of claim 2 wherein the hydroxylamine sulfate has an average particle size of less than about 200 micrometers.

4. The method of claim 3 wherein said alcohol is selected from the group consisting of methanol, ethanol, and mixtures thereof.

5. The method of claim 3 wherein said alcohol is selected from the group consisting of methanol, ethanol, and mixtures thereof.

6. The method of claim 5 wherein an alcohol solution of sodium alkoxide in an amount not in excess of about 1 weight percent over stoichiometry, is admixed with said slurry.

7. The method of claim 5 wherein said sodium alkoxide is admixed in an amount not in excess of 0.3 weight percent over stoichiometry and said average particle size is not in excess of 75 micrometers.

8. The method of claim 5 wherein said slurry is maintained at a temperature from 25 to 30° C.

9. The method of claim 7 wherein said slurry is maintained at a temperature from 25 to 30° C.

10. The method of claim 9 wherein sodium alkoxide is admixed in a stoichiometric amount.

11. The method of claim 10 wherein said acid is perchloric and is admixed in a stoichiometric amount.

12. The method of claim 10 wherein said acid is nitric and is admixed in a stoichiometric amount and the temperature of said solution is maintained at less than 40° C.

13. The method of claim 11 wherein said alcohol is ethanol, said alkoxide is sodium ethoxide, and the perchloric acid being admixed is in an aqueous solution with a concentration not in excess of about 75 percent.

14. The method of claim 12 wherein said alcohol is ethanol, said alkoxide is sodium ethoxide, and the nitric acid being admixed is in an aqueous solution with a concentration not in excess of about 75 percent.

* * * * *